United States Patent [19]

Smith et al.

[11] 4,038,756
[45] Aug. 2, 1977

[54] ELECTRONIC COLUMN GAGE

[75] Inventors: David L. Smith, Brighton; Norman J. Scherr, Jr., Warren, both of Mich.

[73] Assignee: The Valeron Corporation, Oak Park, Mich.

[21] Appl. No.: 606,444

[22] Filed: Aug. 21, 1975

[51] Int. Cl.² .............................................. G01B 7/02
[52] U.S. Cl. ................................. 33/172 E; 33/174 L
[58] Field of Search ............ 33/172 E, 143 L, 147 N, 33/148 H, 174 L, 178 E; 324/103 P

[56] References Cited

U.S. PATENT DOCUMENTS

| | | | |
|---|---|---|---|
| 2,885,660 | 5/1959 | Hecox et al. | 33/172 E |
| 3,168,196 | 2/1965 | Harder | 33/147 N |
| 3,825,827 | 7/1974 | Tumbush | 324/103 P |

*Primary Examiner*—Richard E. Aegerter
*Assistant Examiner*—Wilis Little
*Attorney, Agent, or Firm*—Krass & Young

[57] ABSTRACT

A sizing gage for use with an LVDT probe for producing an output signal representing the deviation of part dimension from a nominally ideal dimension, and a columnar display means comprising vertically arranged light emitting diodes for indicating the degree and sense; i.e., oversize or undersize, of part size deviation according to which of the emitting diodes is lighted. The probe output is an ac signal of polarity representing the degree of deviation. The probe output signal is converted to a dc voltage the amplitude and polarity of which is representative of part size deviation. The dc signal is used as a comparison base against a precision triangle wave signal to generate a squarewave the transitions of which occur at points in time related to the amplitude and polarity of the dc signal. This squarewave is compared to a reference squarewave of fixed transition time to produce a window pulse the width of which is representative of the degree of part size deviation. The window pulse gates clock pulses from a precision oscillator to a pair of decade counters to address a diode excitation matrix. The tens signal is gated to either the oversize light bank or the undersize light bank according to whether the time variable signal leads or lags the fixed time signal. Nulling and range setting circuit details are disclosed.

53 Claims, 9 Drawing Figures

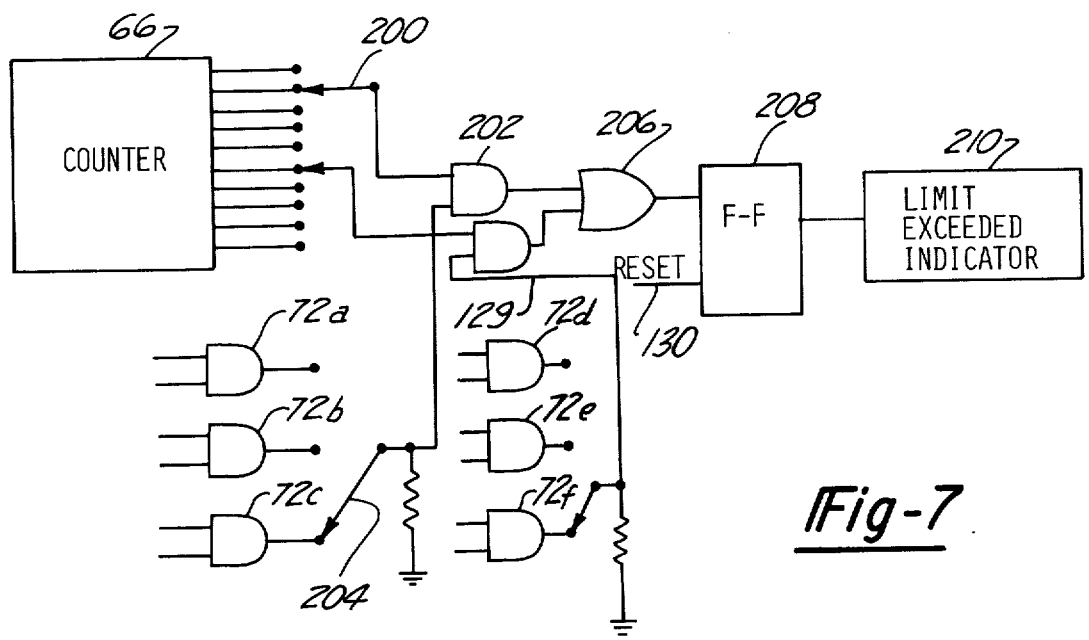
Fig-7
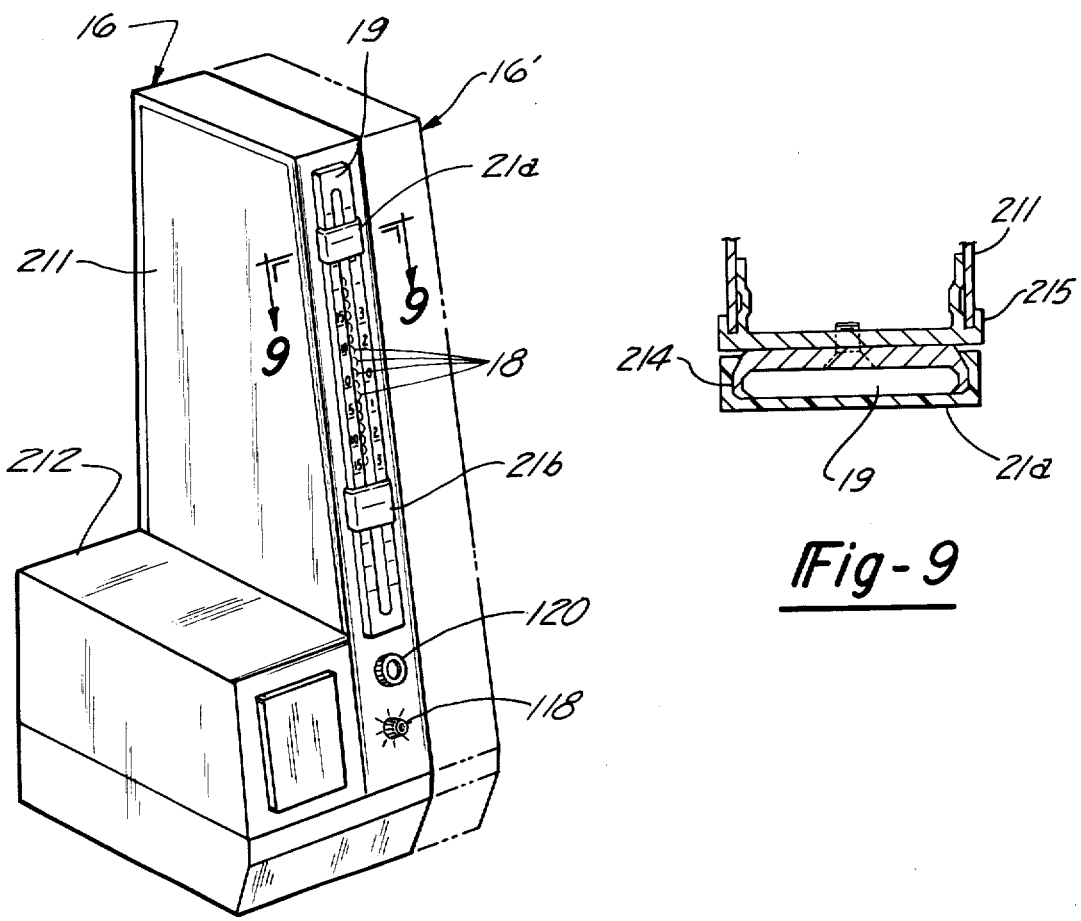
Fig-8
Fig-9

ELECTRONIC COLUMN GAGE

This invention relates to gaging devices for indicating the size deviation of a machined part or the like from a predetermined nominally ideal size.

BACKGROUND OF THE INVENTION

In the course of machining precision parts it is customary to check the part for size by comparing it to a part of nominally ideal or perfect size. One prior art apparatus for accomplishing this comprises a vertical glass tube through which air is caused to flow in varying rates according to the size deviation of a part under inspection. The vertical air column supports an indicator float in a vertical position which is related to part size. Thus, a given float position may be equated to ideal or mean size while positions above and below the given position may be equated to part sizes which are over and under the mean value, respectively.

The columnar display format of the pneumatic size gage is highly favored in view of the graphic character thereof and the ease with which part size may be compared to tolerance limits. However, the pneumatic character of the gaging device described above is disadvantageous from the standpoint of cost, maintenance, and adaptability to expanded data gathering, processing, and display functions. Accordingly, it is desirable to provide an entirely electronic implementation for a gage preferably utilizing the columnar display format and having the characteristics of high accuracy, simplicity of operation, low cost and adaptability to additional display and/or data gathering and processing functions.

BRIEF SUMMARY OF THE INVENTION

The principal object of the present invention is to provide an electronic apparatus for measuring and indicating the size deviation of a machined part or the like from a nominally ideal size and being of such character as to be compatible with a columnar type display unit. In general, this is accomplished by a gaging system adapted to work in combination with a probe or transducer device, such as a linear variable differential transformer probe (LVDT), which generates an electrical signal quantity the analog character of which is related to part size deviation. This system further comprises means for converting the analog signal to a digital signal representing the absolute value of part size deviation, a second signal for indicating the sense, either positive or negative, of size deviation, and display means responsive to the coincident application of these two signal quantities to excite a selected visual display element such as a light emitting diode (LED) in a columnar display.

A second feature of the invention is the novel means by which a conventional analog-type LVDT probe signal may be converted to digital form so as to be readily applied to a digital signal responsive control means for selecting one out of several separately actuable display devices. In addition, the digital signal may be applied to more extensive data processing apparatus such as a microprocessor. In general this is accomplished by generating a repeating waveform such as a squarewave, which varies in timing in accordance with measured part size, generating a pulse count representing the time difference between the repeating waveform and a reference, and utilizing the pulse count as at least a part of an address to be input to a control circuit for a light-emitting diode display. In the preferred form, a sign signal is also generated by determining the relative leading or lagging relationship between the repeating waveform and a reference waveform. The sign signal is thereafter used as a second component of the address to be input into an LED display matrix which operates in a coincident signal address selective mode.

Still another feature of the invention is the accuracy and stability of a true ac zero as opposed to a dc bias or offset zero, together with means for accurately and positively establishing the zero or ideal part size condition. In general, this results from the combination of a probe, such as an LVDT, generating an ac signal which varies in amplitude, either positively or negatively, according to the part size deviation, means for producing a variable amplitude dc signal which represents the peak value of the ac signal amplitude, and analog to digital converter means as described above for effectively converting the variable amplitude dc signal into a time shifting wavefront which may be compared to a fixed time wavefront to generate a "window" which, in turn, is used to gate pulses from a stable clock source into a counter. This combination further comprises a zeroing apparatus which is associated with the probe in such a way as to mix a selectively variable portion of the probe excitation signal with the probe output signal to establish an ac signal, the null value of which represents the zero condition, all actual measured part size deviations having the effect of modulating the ac signal either positively or negatively from the pre-established zero as described above.

Another feature of the invention is the generation of an accurate digital count representing part size by gating pulses between crossing times of a variable dc signal and a triangle wave. This feature results from the use of a phaselocked loop connected to the triangle wave source to generate the count pulses, thereby automatically compensating for any variations which might occur in the triangle wave due to oscillator drift, line voltage change and so forth.

Still another feature of the invention is the use of a novel coincidental address technique whereby one of a large number of individually excitable display devices may be selected for excitation according to the measured part size using only two address bits, both of which are derived by the electronic gaging circuitry from the analog signal output of a conventional probe device. As hereinafter described in greater detail this is accomplished through the use of light-emitting diodes which, although physically arranged in column, are electronically arranged in a coincidently addressable matrix such that only two coincident bits are necessary to select any one of the relatively large number of LED's in the matrix for excitation.

Many additional features and advantages of the invention including the adaptability of the subject device to limit detectors and to more sophisticated data processing and/or display functions will be apparent from a reading of the specification in which an illustrative embodiment of the invention is described in detail. This specification is to be taken with the accompanying drawings in which the various structural, electronic, and functional characteristics of the preferred embodiment are illustrated.

BRIEF DESCRIPTION OF THE DRAWINGS

FIG. 7 is a circuit diagram representing the option of an interconnection of the subject device with a limit detector;

FIG. 8 is a perspective drawing of the outer housing, display panel and adjustment knobs of an actual device constructed in accordance with the invention; and, FIG. 9 is a cross-sectional drawing of the display scale strip of the device of FIG. 9 illustrating the fashion in which it is removably secured to the housing.

DETAILED DESCRIPTION OF THE SPECIFIC EMBODIMENT

FIG. I

Figure 1:
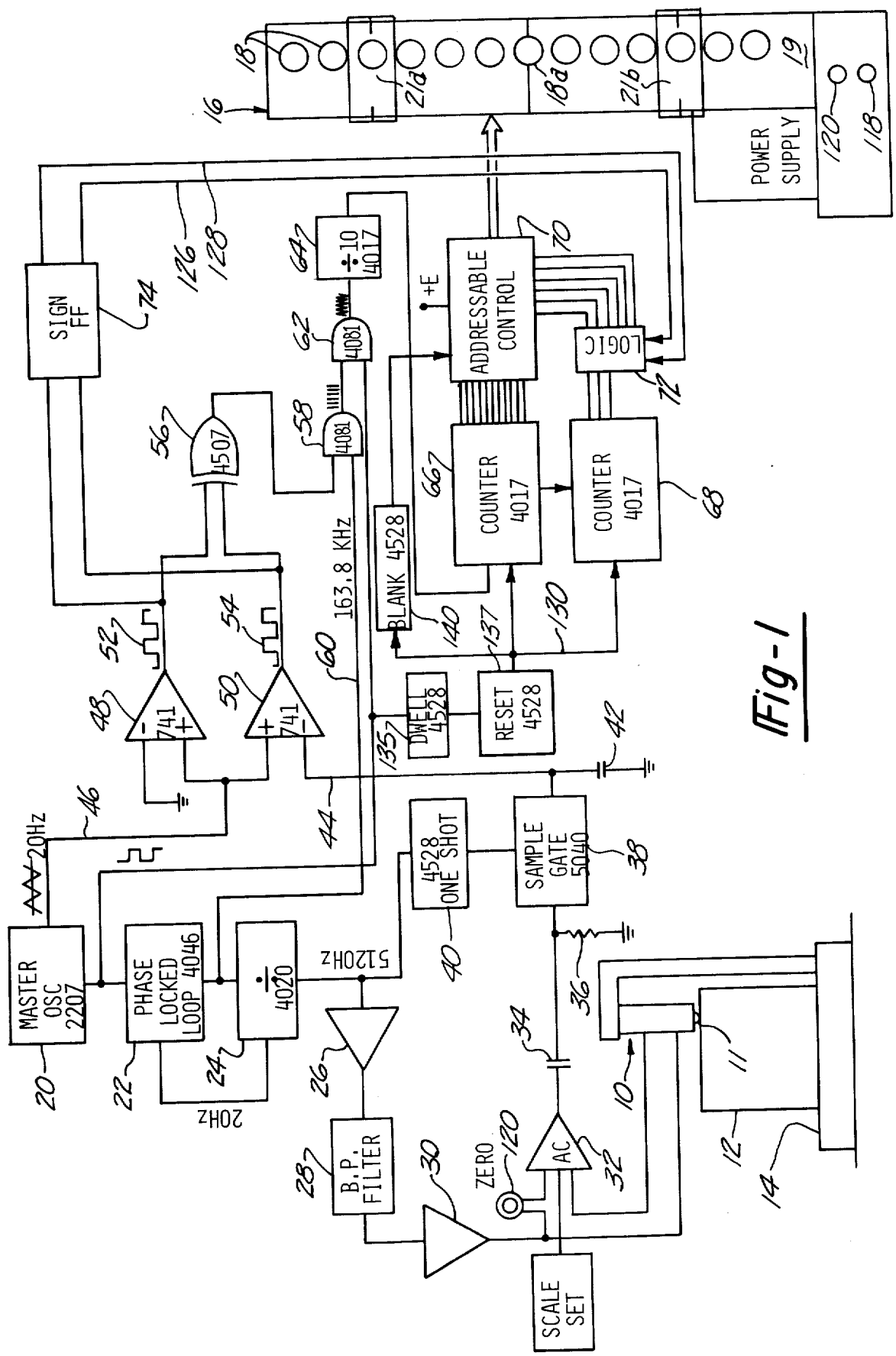
FIG. 1 is a block diagram of the electronic circuitry interconnecting an LVDT probe with a columnar display device having light-emitting diode display elements.

FIG. 1 of the drawings shows an LVDT probe 10 having a plunger type contact 11 for measuring the vertical dimension of a face ground part 12 which is resting upon a precision base 14. Probe 10 produces an output signal which is applied to a column gage 16 to excite one of a plurality of vertically linearly arranged LED indicators 18. The indicators 18 of column gage 16 include a centrally located indicator 18a which, when excited, indicates that the part 12 corresponds in vertical dimension to a predetermined nominally mean dimension; i.e., there is no detectable difference between the measured dimension and a preestablished ideal or mean value. Indicators 18 arranged vertically above central indicator 18a represent increments of variation above the mean size whereas indicators 18 vertically below central indicator 18a represent increments of variation below the mean size. The indicator 18a is preferably green and the remaining indicators are red, although any other color or combination of colors may be employed as desired. Column gage 16 may bear a permanent or replaceable legend strip 19 indicating the value of the increments. The tolerance values for a given part may be set by clear plastic snap-on slide overlay elements 21a and 21b. It will be understood that in the typical column gage, many more indicators are found than are indicated in the drawing of FIG. 1; e.g., one commercially available embodiment bears fifty-one LED's.

The circuitry of FIG. 1 is employed to select for excitation one particular indicator 18 in accordance with the character of a signal which is generated by the LVDT probe 10 as hereinafter described.

A time base for all portions of the system of FIG. 1 is provided by a master oscillator 20 which produces a 20 Hz squarewave output for application to a phase-locked loop 22. The output of the phase-locked loop 22 is a stable 163.8 KHz periodic waveform which is applied to a multiple tap frequency divider 24, from which a 20 Hz signal is connected back to the phase-locked loop to provide phase stability as will be apparent to those skilled in the art. A 5,120 Hz signal from another tap of frequency divider 24 is applied through a squarewave amplifier 26, band pass filter 28 and ac amplifier 30 to the LVDT probe 10 as an excitation signal. The filter 28 filters squarewave harmonics and results in the application of a sinusoidal waveform to the probe 10.

Probe 10, which is described in more detail with reference to FIG. 2, produces an output signal of alternating voltage which varies in amplitude approximately ± 10 volts peak-to-peak depending upon the vertical dimension of part 12 measured by probe 10. As hereinafter described, the output of amplifier 32 connected to probe 10 is adjusted via dial 120, also shown on display 16, such that a part of mean size produces an output signal of zero amplitude whereas an off-size part produces a signal of an amplitude representative of the deviation. The output signal from probe 10 is applied through amplifier 32 and a decoupler comprising capacitor 34 and resistor 36, to a sample gate 38 which is triggered by a 5,120 Hz signal from frequency divider 24 to sample the ac probe signal precisely at peak. This is accomplished by connecting the 5,120 Hz and 10,240 Hz output of divider 24 to a monostable multivibrator or "one shot" 40 which triggers the sample gate 38 at a time which is phase-locked to the excitation of the probe itself as is apparent from inspection of the circuitry of FIG. 1. The pulse output duration of the one shot 40 determines the sample pulse width. Decoupler 34, 36 filters out any dc component which might appear in the output of amplifier 32 and eliminates signal drift.

The amplitude signal which is passed by sample gate 38 is applied as a repeating pulse to a large capacitor 42 such that the stored voltage on capacitor 42 is, after a few sample cycles, a dc voltage the amplitude of which is representative of the measured part dimension. The voltage on capacitor 42 is positive relative to ground for size deviations of one sense and negative for deviations of opposite sense. The advantages of this approach to converting the probe ac signal to a dc value include the fast rise time (if desired) of the dc signal on capacitor 42, thus, giving fast response to signal level changes, and the elimination of any signal leakage back through gate 38 to previous circuit components.

To determine whether the part is oversize or undersize, the measured part dimension signal, i.e., the dc voltage on capacitor 42, is applied by way of conductor 44 to the negative input of one of two identical op-amp comparators 48 and 50. The function of comparators 48 and 50, and circuitry to be described, is to convert the dc voltage which is an analog representation of measured part size deviation to a digital signal for digital data processing.

To accomplish the A/D conversion, a 20 Hz triangle waveform from master oscillator 20 is applied via line 46 to the positive inputs of each comparator 48 and 50 to serve as a time reference. The negative input of comparator 48 is connected to ground. Comparator 48 produces a squarewave 52 having transitions which correspond to the crossing of the triangle and the ground reference. Accordingly, the positive and negative-going transitions of squarewave signal 52 are fixed in time relation to the output of the master oscillator 20. When the signal on capacitor 42 is zero, the transitions of waveform 54 from comparator 50 are coincident in time to those of waveform 52. Variation in the dc level of the signal on line 44 results in production of a squarewave 54 the transitions of which either lead or lag those of wave 52 according to when the triangle wave equals the dc signal amplitude; waveform 54 leads waveform 52 for oversize parts and lags for undersize parts, the degree of lead or lag depending on the part size deviation.

The relative times of two squarewaves 52 and 54 are determined by applying the outputs of comparators 48 and 50 to the inputs of an EXCLUSIVE OR gate 56, the function of which is to generate a window pulse at the twenty Hz frequency but varying in width according to the time difference or phase difference between the two square waveforms 52 and 54. In other words, the output of gate 56 is high whenever the input signals thereto are different but is low whenever the two signals are the same. The output of gate 56 is connected to one input of AND gate 58. The other input of AND gate 58 is connected to receive a 163.84 KHz signal from phase-locked loop 22 by way of conductor 60. This high frequency signal is, in effect, a clock signal which is passed whenever a window pulse is applied to the AND gate by gate 56. Since the window pulse varies in width, the number of pulses passed for each window is subject to variation depending upon measured part dimension; i.e., a part having a dimension which deviates from the mean produces repeating clock pulse bursts having a given number of pulses, and that pulse number is a direct indication of the deviation from the ideal dimension. A part of ideal size produces no pulses.

The pulse burst, if any, is applied through AND gate 62, which is enabled by the twenty Hz signal from oscillator 20, to a frequency divider 64. Divider 64, which is actually a decimal counter, produces an overflow pulse for every ten input pulses. The AND gate 62 has the effect of looking at only the pulse bursts during the positive half of the 20 Hz waveform, and divider 64 has the effect of ignoring pulse count increases of less than ten thus to avoid exciting the indicator 18 representing the next increment of size deviation until a full size deviation is in fact measured.

The overflow pulses from frequency divider 64 are applied to a first decade counter 66 which forms part of the circuitry for addressing the indicators 18 in the column gage 16 as hereinafter described. Overflows from counter 66 are connected to a second decade counter 68. The count in counter 66 represents the "ones" digit in the pulse count whereas counter 68 represents the "tens" digit. The ten output lines from counter 66 are connected to provide first inputs to the addressable control 70, the sign logic being effective to select either the undersize indicator bank or the oversize indicator bank in display 16, depending on the sense of the size deviation.

To determine the sign or sense of the deviation, the fixed and variable phase squarewave signals 52 and 54 from comparators 48 and 50 are applied as opposite inputs to a D-type flip-flop 74 to set or reset the flip-flop according to the leading or lagging condition of waveform 54 relative to waveform 52. The two outputs of sign flip-flop 74 are connected to opposite inputs of sign control logic 72 to enable gates which control the excitation of either the upper or lower bank of indicators 18 in column gage 16 depending upon whether the part measures oversize or undersized. In other words, the number of pulses in the burst of pulses passed by AND gate 58 is an indication of the absolute size deviation whereas the sign signal from flip-flop 74 is an indication of the sense or direction of size deviation, either oversize or undersize. The details of the counters 66, 68, control 70, logic 72, and a reset 137 and blanking control unit 140 are described with reference to FIGS. 4 and 5.

FIG. 2

Figure 2:
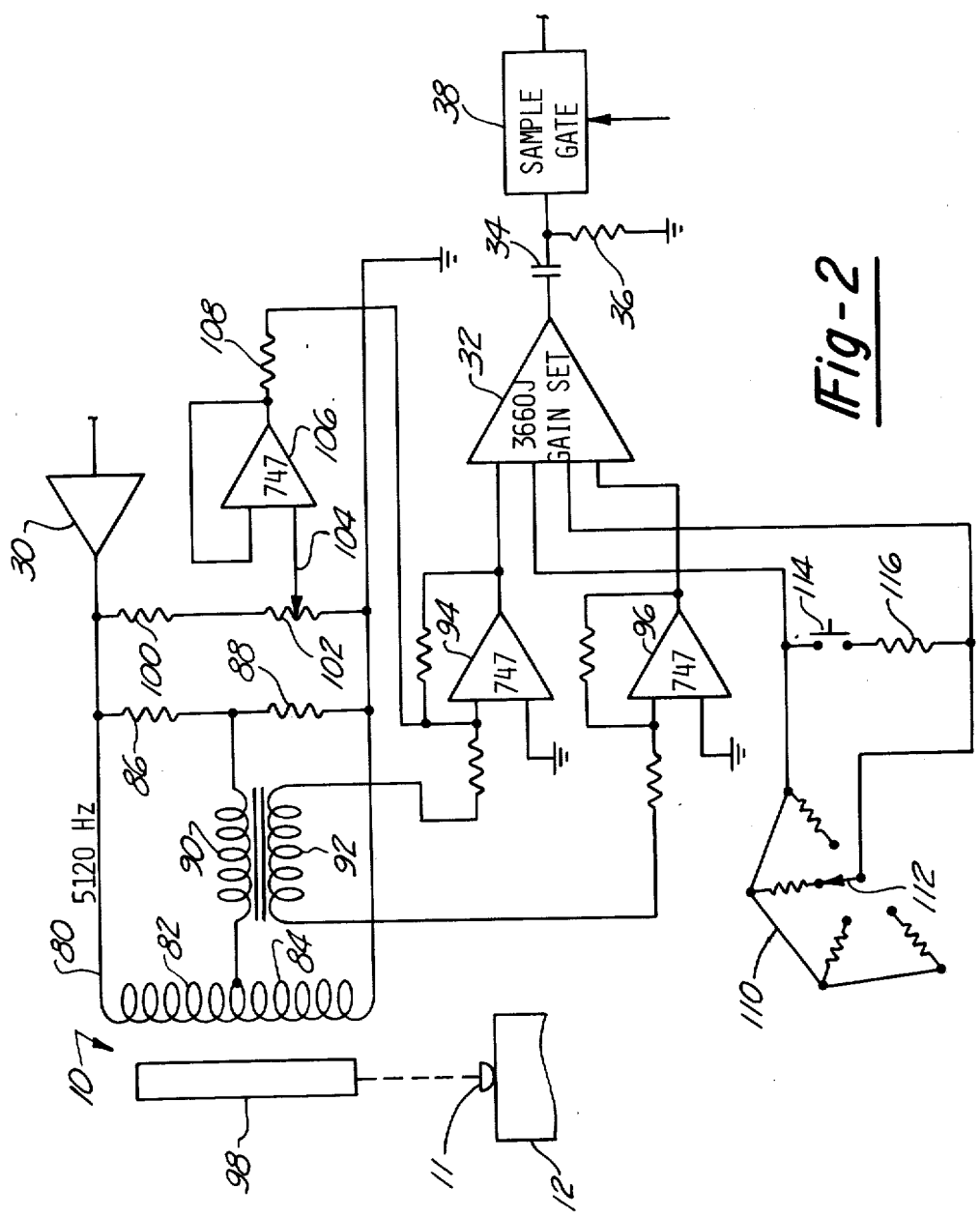
FIG. 2 is a more detailed circuit diagram of the portion of the circuit of FIG. 1 including and immediately adjacent the signal generating probe, and illustrating the zeroing and scale setting apparatus.

The probe 10 is shown in FIG. 2 to comprise an inductive coil 80 divided into upper and lower parts 82 and 84 by a center tap and connected to receive the 5,120 Hz output of amplifier 30 as an excitation signal. A voltage divider comprising resistors 86 and 88 is connected across coil 80. The primary winding 90 of a small output transformer is connected between the center tap of coil 80 and the junction between the voltage divider resistors 86 and 88. A secondary winding 92 which is inductively linked to primary winding 90 has opposite ends thereof connected through amplifiers 94 and 96 to the amplifier 32, the output of which is connected through RC circuit 34, 36 to the sample gate 38 as previously described.

The voltage which appears across primary 90 is a function of the electrical balance between coil portions 82 and 84 which, in turn, is controlled by the position of a ferrite tuning slug 98 which is mechanically connected to the part contact 11 as previously described. Variation in the vertical dimension of part 12 operates through contact 11 to displace the slug 98 relative to the coil portions 82 and 84 to vary the impedance balance therebetween. When the currents through the upper and lower loops represented by coil portions 82 and 84 and voltage divider resistors 86 and 88 are equal, the loop currents cancel through primary 90 and no output or secondary voltage is generated. As the loop currents become unequal a voltage is generated in the secondary winding 92, the magnitude and phase of which is representative of the degree and direction of slug displacement. For example, if the part 12 is slightly larger, slug 98 is displaced upwardly increasing the impedance of coil portion 82 and decreasing the impedance of coil portion 84. This has the effect of decreasing the current in the upper loop and increasing the current in the lower loop causing a voltage to be impressed across coil 90, the amplitude of which is representative of the extent of displacement of slug 98 and the polarity or phase of which is representative of the direction of displacement of slug 98. If, on the other hand, the part is smaller, slug 98 moves downwardly to decrease the loop current in the lower section of the probe circuit causing a voltage of opposite phase or polarity to be generated in the secondary winding 92.

When a part of ideal or mean dimension is placed in the probe 10, the position of the contact 11 and the slug 98 is mechanically adjusted to produce a substantially balanced condition. Thereafter, an electronic adjustment must be made within the circuitry of FIG. 2 to zero or null the display unit 16. To accomplish this a second voltage divider comprising resistors 100 and 102 is connected across the coil 80 in parallel to voltage divider resistors 86, 88 and a variable wiper 104 is connected between resistor 102 and the input of an operational amplifier 106, the output of which is connected through resistor 108 to an input of amplifier 94. Thus, by varying the position of the wiper 104 on resistor 102 a selectively variable portion of the 5,120 Hz excitation signal can be algebraically mixed with the output signal appearing across secondary 92 to establish an ac zero at the output of amplifier 32; i.e., the position of wiper 104 is varied until the inputs to the amplifier 32 are exactly the same. At this point, the output of amplifier 32 is zero and the sample voltage passed by gate 38 to the storage capacitor 42 is zero.

The circuit of FIG. 2 also discloses means for adjusting the scale or range of the device. This includes a resistor network 110 and a variable position selector wiper 112 connected across the gain set inputs of amplifier 32 such that moving the wiper 112 between the taps of the resistors in network 110 effectively varies the gain of amplifier 32 and thus the magnitude of the output signal which is generated for any given increment of displacement of tuning slug 98. The resistors in network 110 are of such varying value as to produce suitable range variations in measurable part size deviation.

The circuit of FIG. 2 further comprises means for temporarily and instantaneously increasing the gain of amplifier 32 during the zeroing operation thereby to provide a "zero magnification" function whereby the display unit may be fine-tuned to the null or zero condition using a high gain setting which is thereafter reduced for normal measurement. This ensures that the original zero setting is not off by some small amount which, at the current gain setting, indicates less than a full increment of displacement in either the positive or negative direction.

To accomplish this a spring-biased push button 114 is connected in series with a resistor 116 across the gain set terminals such that temporary depression of the push button 14 results in a temporary high gain setting of amplifier 32. Push button 114 is preferably mechanically combined with the range switch 118 on the display unit 16, it being understood that rotation of the switch 118 varies the angular position of wiper 112 for range selection. In other words, switch knob 118 is rotatable for range selection purposes but may be depressed against the force of a bias spring for temporary zero magnification during which one adjusts knob 120. It is understood that the shaft to which know 120 is attached is interconnected with the wiper 104 to vary the position thereof on the voltage divider resistor 102.

The LVDT probe comprising center tap coil 80, slug 98, and contact 11 is a commercial product which may be purchased from Brown & Sharpe; Model GT-21 has been found to be satisfactory in actual use.

A summary of the operation of the circuit as described with reference to FIG. 2 will now be given with specific reference to the waveform diagrams of FIG. 3.

FIG. 3

Figure 3:
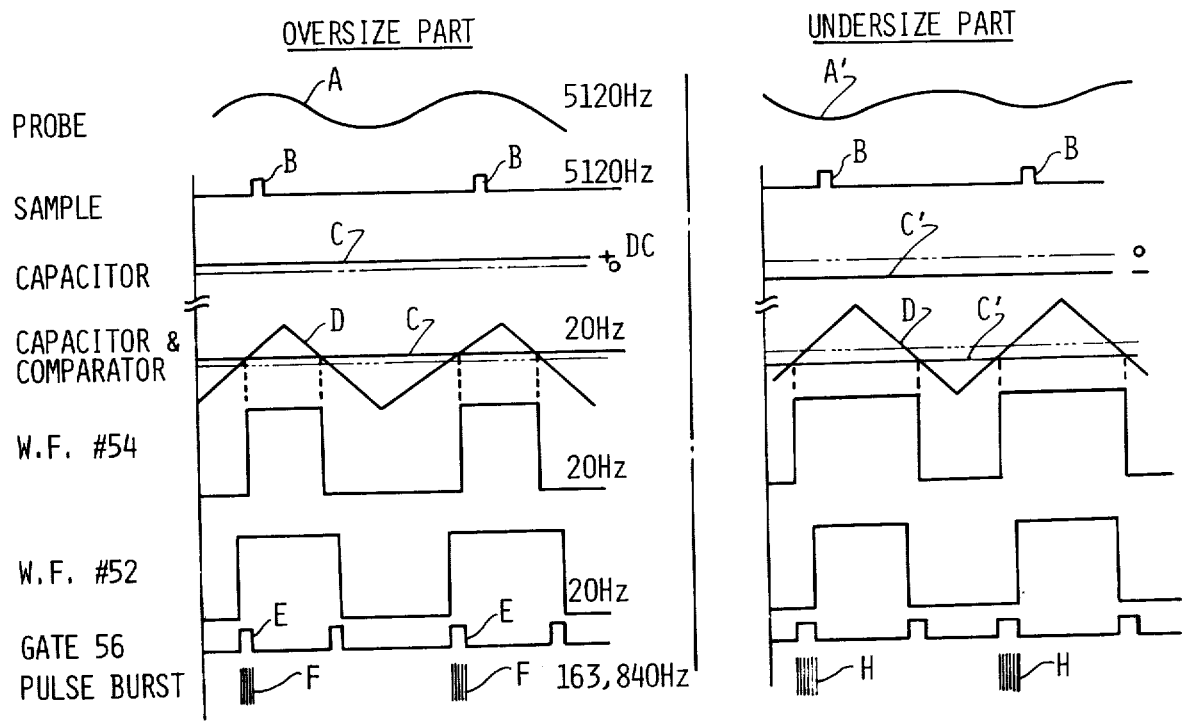
FIG. 3 is a timing diagram useful in explaining the operating of the circuit of FIGS. 1 and 2.

FIG. 3 shows two sets of waveforms which result in the circuits of FIGS. 1 and 2 under certain part measurement conditions. In each case it is assumed that the output from amplifier 32 of probe 10 has been adjusted to null with a part of mean dimension.

The top left portion of FIG. 3 is an example of the waveforms generated by placing an oversize part in the probe apparatus of FIG. 10. Under these conditions, the tuning slug 98 is displaced away from the balanced or zero condition such that an ac voltage is generated across secondary winding 92 of the probe output transformer; this voltage is represented by waveform A in FIG. 3. A sample pulse B is applied by one shot 40 to the sample gate 38 on each cycle of the probe output voltage to apply a positive signal of an amplitude representing the degree of part size deviation to the storage capacitor 42 such that a positive voltage represented by waveform C is ultimately generated. This voltage is compared to the triangle reference D in comparator 50, the output of which is the waveform 54 shown in FIG. 3. It will be noted that the transitions in the waveform 54 coincide with the intersections between the triangle wave D and the capacitor voltage C; since the capacitor voltage is positive the leading edge in waveform 54 occurs later in time than the leading edge of square waveform 52 also shown in FIG. 3. The window pulse E produced by EXCLUSIVE OR gate 56 is equal in duration to the time difference between the leading edges of waveforms 52 and 54 and gates pulses through gates 58 and 62 to present pulse burst F to the counters 66 and 68 are previously described. Note that pulses in burst F occur after the leading edge of square waveform 52. All waveforms are synchronized by the phase-locked loop 22 and divider 24 to establish the proper phase relationship and to compensate for signal drift due to line voltage and temperature changes. In other words, a given number of count pulses always corresponds to a cycle of the triangle wave regardless of variations therein.

In the second example shown in FIG. 3 the probe voltage A' is negative indicating an undersize part and a shift of the slug 98 in such a direction as to unbalance the probe output transformer as previously described. The voltage is again sampled by pulses B but results in a negative charge on capacitor as represented by waveform C'. This waveform is again compared to the triangle D and the intersections represent transitions in waveform 54 as shown. However, since the dc signal level C' is negative, the leading edge in waveform 54 precedes the leading edge of waveform 52 and results in an early generation of the window pulse from gate 56. Accordingly, the pulse burst H generated for the undersize part precedes the leading edge of waveform 52.

By way of overall summary, it will be recalled that the number of pulses in each of the bursts F and H is representative of the degree of part size deviation and the time relationship between the leading edges of waveforms 52 and 54 is representative of whether the part size deviation is over or under the mean size.

Figure 5:
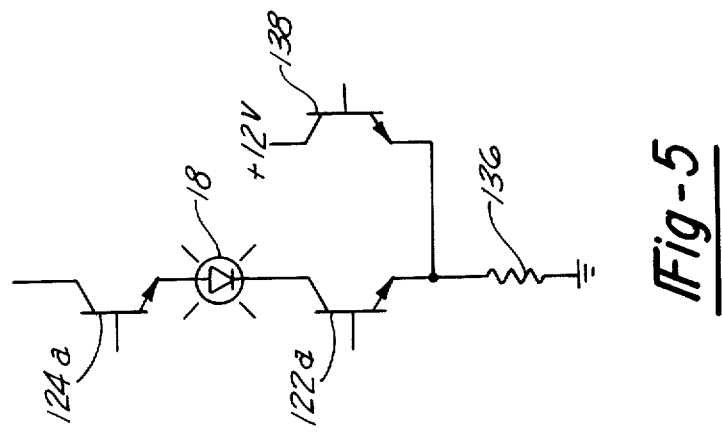
FIG. 5 is a detailed circuit diagram of a representative portion of an actual LED coincident current selection connection.
Figure 4:
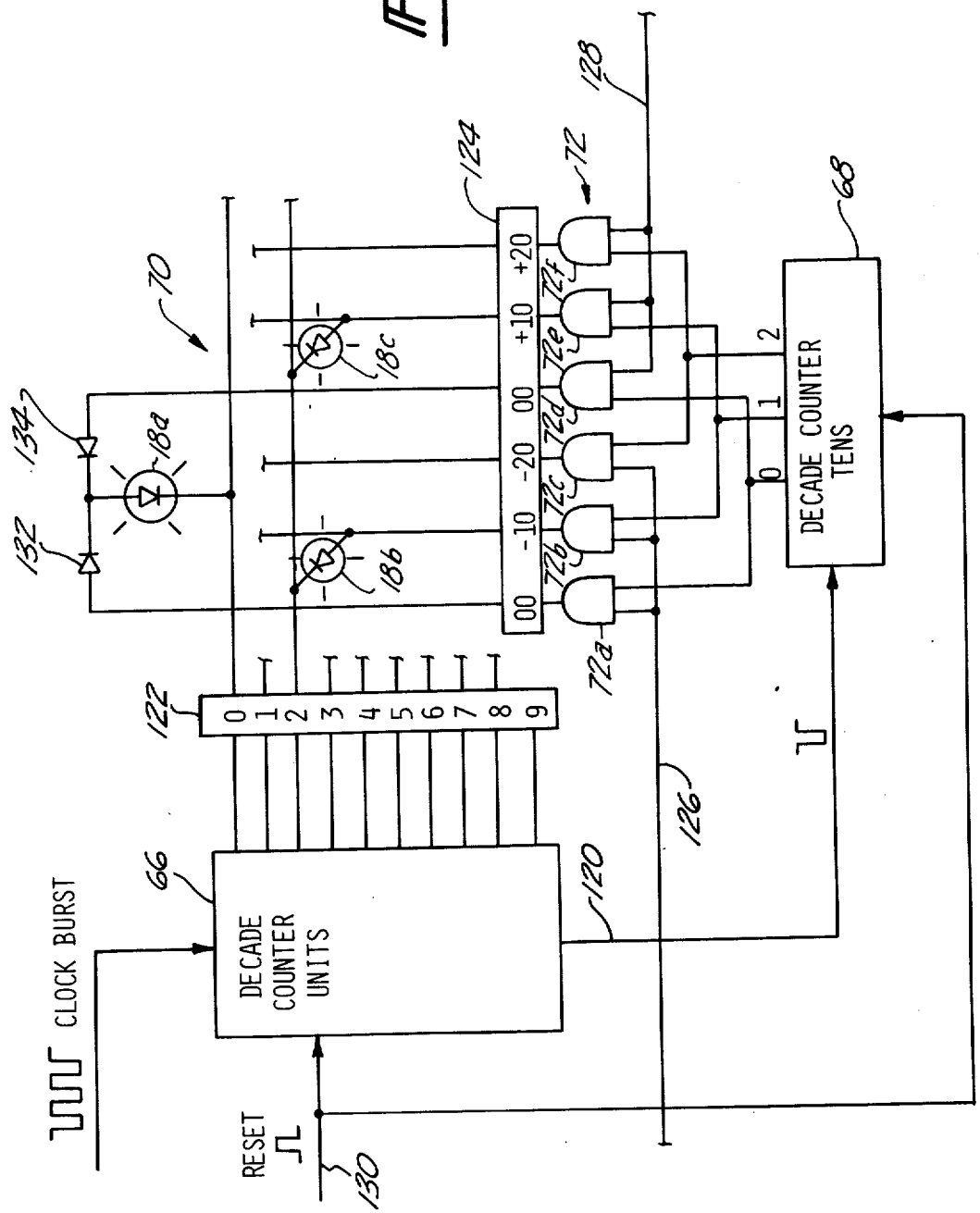
FIG. 4 is a detailed circuit diagram of a representative portion of the display system and the circuitry for addressing the display system.

FIGS. 4 and 5

FIGS. 4 and 5 are detailed circuit diagrams of representative portions of the display control circuitry in the unit of FIG. 1.

In FIG. 4 the indicators 18a, 18b, and 18c are light emitting diodes and are connected into a matrix 70 representing the addressable control circuitry of FIG. 1 and comprising a grid of conductor rows and columns; the term "row" being arbitrarily assigned to the horizontally extending lines in FIG. 4 and the term "column" being arbitrarily assigned to the vertically extending lines in FIG. 4. Each LED indicator 18 is electrically connected between a row conductor and a column conductor such that coincident interconnection of the selected row and column conductors to a voltage source and ground, respectively, is operative to bias the LED interconnected between those two selected conductors into a light emitting condition.

Decade counter 66 representing the units for ones value of the pulse count is shown connected to receive the clock pulse burst and has an overflow line 120 connected to the input of decade counter 68 to represent the tens digit of the pulse count. The decimal output lines numbered 0 through 9 of counter 66 are connected through a current buffer 122 to the row conductors of the addressable control matrix as shown. Since there are 51 LED indicators in the preferred display unit 16, it is necessary to use only the first three outputs numbered 0 through 2 of the tens counter 68. These outputs are connected through sign logic gate bank 72 and a second current buffer 124 to the vertical column lines of the LED excitation matrix 70. Logic gate bank 72 comprises six identical AND gates 72a through 72f. Gates 72a and 72d each have one input connected to the zero output of decade counter 68, gates b and e each have one input connected to the one output of decade counter 68 and gates c and f each have an input connected to the two output of counter 68. All of gates a, b and c have the second input connected to the lead pulse output line 126 from sign flip-flop 74 of FIG. 1 such that all three gates 72a, b and c are enabled for the undersize part measurement condition; i.e., the leading edge of waveform 54 precedes the leading edge of waveform 52 as previously described. Similarly, the lag pulse line 128 from sign flip-flop 74 of FIG. 1 is connected to all three gates 72d, e and f to enable all three gates for an oversize part measurement. The result of the gates 72 is to enable one group of column lines for oversize parts and another group of column lines for undersize parts. The first group of column lines is associated with the upper LED indicators on display 16 and the second group of output column lines is associated with the lower LED indicator set on display unit 16.

The operation of the circuit of FIG. 4 will be described by reference to three specific examples. In all cases, a reset pulse on line 130 initializes counters 66 and 68 to zero.

First assume a part which is undersize by twelve increments of measure is placed in probe 10. It is thus desirable to excite LED indicator 18b which is located on the scale of display 16 in the twelve increment position of the undersize portion of the scale. A pulse count of twelve causes output row line 2 of decade counter 66 to go high producing one-half of the necessary selection signals for LED indicator 18b. The tenth pulse received enables overflow line 120 to decade counter 68 and advances the counter from the zero to the one condition causing an input signal to be applied to both gates 72b and 72e. If the part is undersize, line 126 is high while line 128 is low. Hence, only gate 72b receives both enabling inputs thus to excite the −10 column line which completes the selection of LED indicator 18b.

As a second example assume that a pulse count of twelve is received but that the part is oversize; hence, it is desirable to select for excitation LED indicator 18c. The 2 output line of decade counter 66 is again selected for excitation and the 1 output line of decade counter 68 is again selected for excitation. However, for an oversize part only line 128 is high thus to complete the selection of gate 72e. This excites the column line +10 needed to complete the selection for excitation of LED indicator 18c. In each case, the two counters supply row and column selection bits and flip-flop 74 supplies a sign bit to steer the column bit to the correct LED group, either plus or minus.

If a zero pulse count is received, the reset pulse on line 130 has previously reset both counter 66 and 68 to the zero condition selecting the uppermost row conductor as well as one input to each of gates 72a and d. The sign flip-flop 74 will simply remain in whatever state it finds itself thus causing either line 126 or 128 to go high.

If line 126 goes high, gate 72a is enabled to complete the selection to indicator 18a through diode 132. If, on the other hand, line 128 is high, gate 72d is selected to energize indicator 18a through diode 134. Diodes 132 and 134 are connected together in a common OR junction such that a zero pulse count of either polarity operates to excite indicator 18a.

FIG. 5 is a schematic circuit diagram of the buffer connections 122 and 124 necessary to light a given LED indicator 18. Buffer 124 comprises a plurality of transistors such as 124a the collectors of which are connected to a 12-volt source and the emitters of which are connected to one side of the diode indicators 18 as shown. Buffer 122 comprises a similar bank of transistors such as 122a, the collector electrodes of which are connected to the other terminals of the diode indicators 18 and the emitters of which are connected through current limiting resistor 136 to ground. The counter outputs are connected as base drive signals to the transistors in buffers 122 and 124 to control the conductivity thereof; such transistors, except those selected, being normally biased to the off condition. Thus, when the LED indicator 18 is selected by the counters 66 and 68, base drive signals are applied to transistors 122a and 124a to render the transistors conductive and to complete a series circuit from the 12-volt source through the collector to emitter circuit of transistor 124a, through a portion of a column drive line, the LED indicator 18, a portion of the row line conductor, the transistor 122a and the resistor 136 to ground. Current flow through the LED indicator causes it to emit light as is well known to those skilled in the art.

A blanking function is desirable to prevent a short term excitation of LED indicators 18 between zero and the selected indicator during the count up portion of each pulse burst. This can be accomplished by connecting transistor 138 in parallel shunt relationship with each of the transistors 122a in buffer 122 to apply a 12-volt signal to the emitter electrode of all transistors in buffer 122 until the count-up sequence has been accomplished. A control signal to the base of transistor 138 is provided by connecting the 20 Hz squarewave signal from master oscillator 20 through a dwell unit 135 which produces a fixed delay, a reset pulse source 137 and second pulse 140 to the base electrode of transistor 138 to bias the transistor on. This places the same potential on both sides of the diodes 18 to prevent the excitation of any LED indicator until the count-up sequence has been accomplished. The reset and delays may be accomplished by means of a simple one shot multivibrator, as will be apparent to those skilled in the art.

FIG. 6

Figure 6:
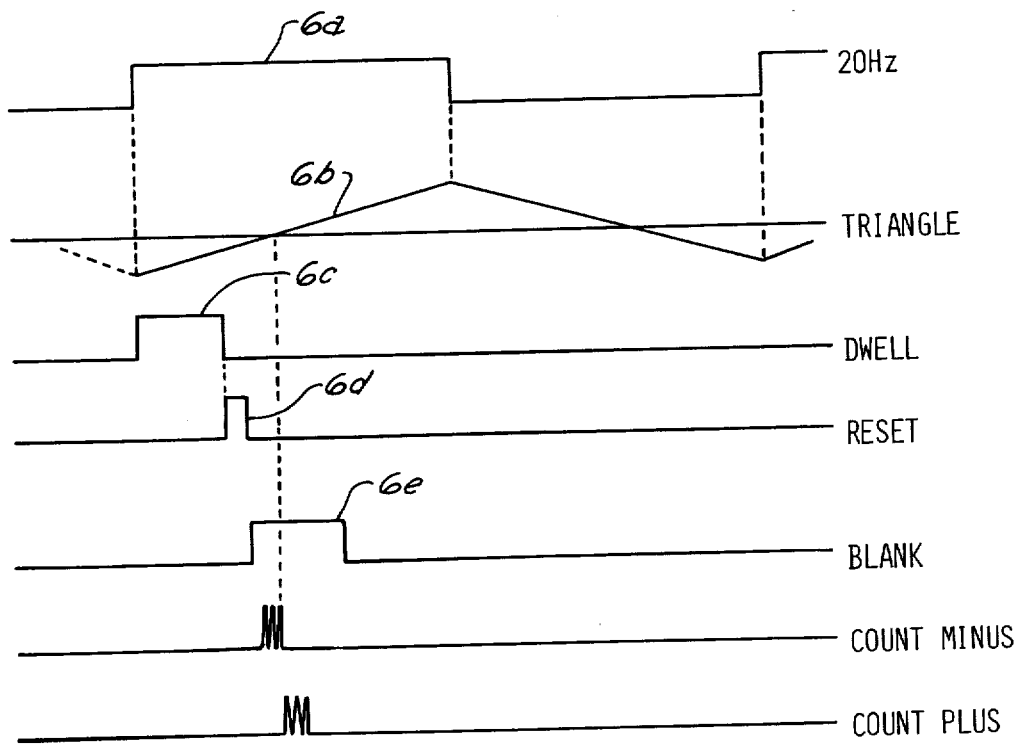
FIG. 6 is a timing diagram useful in explaining the operation of the circuit of FIGS. 4 and 5.

FIG. 6 is a waveform timing diagram which is representative of a typical operation of the circuitry of FIGS. 4 and 5. FIG. 6a shows the 20 Hz timing signal whereas FIG. 6b shows the triangular waveform. FIG. 6c shows a dwell pulse which is output from the one shot 135 in FIG. 1 beginning with the leading edge of the 20 Hz signal. The reset pulse from unit 137 is illustrated on line d of FIG. 6 whereas the blanking pulse 6e is shown to be triggered by the trailing edge of the reset pulse as previously described. Both the plus and minus count pulse bursts occur within the blanking time thus to produce the actual count-up function. Accordingly, only the finally selected LED indicator will actually be excited to produce a visual display.

FIG. 7

It is often desirable to employ, in combination with the basic display function provided by the apparatus of FIGS. 1 and 2, an indication that some undersize limit is exceeded such that machine shut-down can be considered or automatically effected. For example, an indication may be produced whenever a part is at least 21 increments of measurable part size deviation below the mean value. The circuitry of FIG. 7, representing a very modest addition of components over those already present in the circuitry of FIGS. 1 and 2, may accomplish this purpose.

In FIG. 7 the output lines of the units counter 66 are connected to taps which are individually selectable by means of a manually positionable wiper 200 which sets the units value of the limit to be detected. The output side of wiper 200 is connected to one input and an AND gate 202. The other input to AND gate 202 is taken from a manually positionable wiper 204 which may be positioned on the output tap of any one of the three AND gates 72a, 72b and 72c representing the three tens digits of the undersize condition. For a limit of −21, wiper arm 200 is set to the −1 position while wiper 204 is set to the −20 position such that the output of gate 202 is high whenever a pulse count of −21 in the below-mean direction is produced. Similar circuitry utilizing wipers connected to counter 66 and gates 72d through 72f provides a signal to the other input of OR gate 206 to provide the oversize indication. The output of gate 206 is connected to the set input of a flip-flop 208, the opposite input being connected to the reset line 130 as shown. The 1 output of flip-flop 208 is connected to an indicator 210 such as a lamp or buzzer to give a visual or audible indication that the present limit has been exceeded. Wiper arms 200 and 204 are, of course, connected to manually manipulable devices such as thumb wheels or dials for adjustment to other limits. Visual indicator 210 may, of course, be replaced with a direct feedback connection from flip-flop 208 to the machine which is making parts to effect an automatic shut-down if desired.

FIGS. 8 and 9

FIGS. 8 and 9 illustrate a preferred packaging of a display unit 16 constructed so as to be easily operated as well as to be electrically interconnected with additional display units such as 16' in FIG. 8.

The unit 16 comprises the upright housing 211 which is rearwardly angled for ease of reading and which is disposed atop a base portion 212 comprising a power supply for the electronics illustrated in FIGS. 1 and 2. A panel on the hidden side of housing 211 may be removed to provide access to at least some of the interconnect circuitry and to facilitate the installation of additional units such as 16' in FIG. 8.

The LED indicators 18 are arranged in a vertical row with the green indicator 18a disposed in the center. The zero adjust knob 120 and the range selector 118 are disposed beneath the scale 19 as previously described.

Scale 19 takes the form of a plastic strip which slides from the top into a bracket 214 secured to a plate 215 on the front of the upright housing 211. The left and right sides of scale strip 19 have a silk-screened pattern of numbers disposed thereon and the center strip is left transparent to permit viewing of the LED indicators 18. One side of strip 19 may be printed with one or more scales in one range group while the other side may be printed with scales in another range group. Accordingly, it is possible to simply slide the scale strip 19 out of the bracket 214, reverse it, slide it back in and thus accomplish a suitable scale change along with appropriate adjustment of the range selector switch 118. Tolerance range slide 21a is also shown in FIG. 9 to clip around the bracket 214.

The second indicator unit 16' is adapted to be mechanically connected adjacent and in parallel with the unit 16 and electrically interwired therewith to use the same power supply but to receive signals from a second probe (not shown). The two probes may, of course, be associated with the same or different parts and provide a convenient comparison due to the adjacent and aligned disposition of the two display units 16 and 16'.

Following the concept of modular add-on units, it is also within the scope of the present invention to provide a unit, similar to display unit 16', for performing mathematical functions such as addition and averaging such that signals from several probes or from successive readings on a single probe may be mathematically processed as desired. It is noteworthy that the provision of a digital sign signal is particularly amenable to microprocessors of the type now well known in the art such that the microprocessor may be prewired and prebuilt in the factory and shipped to the end user for straightforward electrical interconnection with existing display units.

To assist the practitioner in constructing the invention, the major circuit blocks of FIGS. 1, 2, 4 and 7 have been labeled with the identifying numbers of commercially available integrated circuit packs which perform the required functions. It will be appreciated, however, that many different implementations are possible.

It is to be understood that the subject invention has been described by reference to specific embodiments and that many additions and modifications thereto will be apparent to those skilled in the art. Accordingly, the foregoing description is not to be construed in a limiting sense.

The embodiments of the invention in which an exclusive property or privilege is claimed are defined as follows:

1. A sizing gage having a columnar display for indicating the measured sense and degree of part size deviation from a mean size comprising: probe means for measuring part size; display means including a plurality of individually excitable indicators; means exciting one of said indicators in response to measuring a part of said mean size and also including means exciting the indicators on opposite sides thereof in response to measuring increments of part size deviation of respectively opposite sense; said means including: first signal means for generating a first waveform the relative timing corresponding to a size reference; second signal means connected to said probe means for generating a second periodic waveform, said second signal including means varying the relative timing of said second waveform in accordance with measured size of said part; comparator means sensing the degree and sense of the timing difference of said first and second waveforms; third signal means responsive to said comparator means producing a digital count corresponding to said degree of relative timing difference between the first and second waveforms; fourth signal means responsive to said comparator means producing a signal corresponding to the sense of said relative timing difference; and addressable control means connecting the third and fourth signal means to the display means and responsive to the character of said count and sense to excite a particular one of said indicators.

2. Apparatus as defined in claim 1 wherein said indicators are arranged linearly.

3. Apparatus as defined in claim 2 wherein the one of said indicators representing said mean size is located centrally of said linear array.

4. Apparatus as defined in claim 1 wherein the indicators provide a visual signal upon excitation thereof, said one of said indicators being of a different visual character than the remainder of said indicators.

5. Apparatus as defined in claim 4 wherein said indicators are light-emmiting diodes.

6. Apparatus as defined in claim 1 including scale means disposed adjacent said indicators for indicating the absolute value and sense of the part size deviation.

7. Apparatus as defined in claim 6 including means movable over said scale means for indicating tolerance limits.

8. Apparatus as defined in claim 1 wherein said probe means comprises first and second normally balanced sensing circuits, part contacting means for altering the balance between said circuits according to part size, and output circuit means for producing an electrical signal indicating the degree and direction of imbalance.

9. Apparatus as defined in claim 8 wherein the output means comprises a transformer circuit having a primary coil and a secondary coil, the signal across said secondary coil being nominally zero for balanced circuit conditions and of increasing amplitude of positive and negative polarity for respectively opposite directions of electrical imbalance in said probe means, the amplitude of the signal across said secondary being an indication of the degree of electrical imbalance.

10. Apparatus as defined in claim 1 wherein the second signal means includes amplifier means connected to said probe means for producing an alternating waveform representing part size deviation.

11. Apparatus as defined in claim 10 including means for generating an alternating current excitation signal, means for applying the alternating current signal to the probe for exciting same, and selectively variable means for mixing a variable portion of the ac signal with the output of the probe for nulling the output signal from the amplifier means.

12. Apparatus as defined in claim 11 including selectively variable means for controlling the gain of said amplifier means.

13. Apparatus as defined in claim 12 wherein said selectively variable means is a range selector comprising a plurality of range-selecting electrical components, and dial means for individually connecting said components to said amplifier means for varying the gain thereof.

14. Apparatus as defined in claim 12 wherein said selectively variable means comprises a high-gain resistor and push-button means for temporarily connecting said resistor to the amplifier means for increasing amplifier gain during a nulling procedure.

15. Apparatus as defined in claim 10 including sample gate means connected to the output of the amplifier means, means for connecting the ac signal to the sample gate to control the opening of the sample gate in fixed phase relationship with the probe excitation signal.

16. Apparatus as defined in claim 15 including dc voltage storage means connected to the output of the sample gate for providing a dc voltage of amplitude and polarity representing the average amplitude and polarity of the sampled pulses applied thereto, said dc voltage being connected to said second means such that the relative timing of said second periodic waveform varies according to the dc value of the stored signal.

17. Apparatus as defined in claim 1 further including oscillator means for producing a fixed frequency alternating waveform, means for applying a signal related to said waveform to said probe means for excitation thereof, and means for applying said waveform to said first and second signal means as a time base for generation of said first and second waveforms.

18. Apparatus as defined in claim 17 including output means associated with said probe means and responsive to part size deviations to produce an output signal of amplitude and polarity related to the degree and sense of part size deviation, respectively, and adjustable nulling means connecting selectively variable portions of the alternating waveform to said probe output for adjusting the probe output to zero.

19. Apparatus as defined in claim 18 including a sample gate connected to receive the probe output for gating a signal proportional to the probe output to said second signal means, said alternating waveform being connected to said sample gate as a control signal for controlling the sample times during which said probe output is sampled whereby all of the sampled probe output signals are of the same polarity for a part size deviation of given sense.

20. Apparatus as defined in claim 19 further including means for connecting a signal related to the alternating waveform to the first and second signal means as a common time reference.

21. Apparatus as defined in claim 1 wherein said first and second waveforms are substantially periodic squarewaves of alternating amplitude level, said third signal means comprising EXCLUSIVE OR gate means connected to receive the first and second periodic waveforms and to produce an output signal only when the waveforms are dissimilar, and gate means connected to receive a high frequency clock signal and the output of said EXCLUSIVE OR gate means thereby to pass said high frequency signal as a digital count proportional in number to the duration of the output of said EXCLUSIVE OR gate, that is phase locked to the reference frequency.

22. Apparatus as defined in claim 1 further including a digital counter connected to receive said digital count and having a plurality of output lines separately energizable in response to respective counts, said addressable control means being responsive to a selected output line of the counter and said sense signal for selecting for excitation one of said indicators.

23. Apparatus as defined in claim 22 including a second decimal counter connected to receive overflows from the first counter to represent the next higher order number of said count.

24. Apparatus as defined in claim 23 wherein said indicators are connected for excitation in a grid comprising row and column excitation conductors requiring a coincidence of two signals for selection of any given indicator.

25. Apparatus as defined in claim 24 wherein said column excitation conductors are divided into first and second groups representing opposite senses of part size deviation, said fourth signal means comprising a flip-flop connected to receive the first and second periodic waveforms and being set and reset to states representative of the relative timing therebetween, the output of said flip-flop being connected to gate means for directing the output of said second counter to respective first and second groups of column excitation conductors according to the relative timing between said periodic waveforms.

26. Apparatus as defined in claim 1 further including an oscillator for producing a repeating waveform, means for connecting the oscillator to the first and second signal means, and a phase-locked loop connected to said oscillator to produce a digital pulse train of fixed relation to said repeating waveform, said phase-locked loop having the output thereof connected to said third signal means for providing said digital count.

27. In a sizing apparatus for use with probe means for measuring part size and a columnar display for indicating the measured sense and degree of part size deviation from a mean size comprising: display means including a plurality of individually excitable indicators; said sizing apparatus including means exciting one of said indicators in response to measuring of mean size and further including means exciting the indicators on opposite sides thereof in response to sensing increments of part size deviation of respectively opposite sense; first signal means adapted to be connected to a probe means including means for generating a periodic wave form and means varying the relative timing of said wave form in correspondence with the degree of measured part size deviation; and second signal means for producing a digital count corresponding to the degree of variance in the timing of said periodic waveform relative to a reference; third signal means for producing a signal corresponding to the sense of said relative timing; and, addressable control means connecting the second and third signal means to the display means and responsive to the character of said count and sense to excite a particular one of said indicators.

28. Apparatus as defined in claim 27 wherein said indicators are arranged linearly and a central one of said indicators represents said ideal size.

29. Apparatus as defined in claim 28 wherein said one indicator provides a signal of one character and the remainder of said indicators provide a signal of another distinct character.

30. Apparatus as defined in claim 29 wherein said indicators provide a visual output signal.

31. Apparatus as defined in claim 27 wherein the first signal means comprises amplifier means for producing an ac output signal the amplitude of which represents part size deviation degree and the polarity of which represents the sense of said deviation.

32. Apparatus as defined in claim 31 including means for varying the gain of said amplifier means.

33. Apparatus as defined in claim 32 wherein said gain varying means comprises a plurality of gain control elements, and means for selectively connecting individual elements of said plurality into operative circuit relationship with said amplifier to vary the measured deviation range.

34. In a sizing apparatus for determining part size deviations and indicating the degree and sense of a measured part size deviation from a nominally mean dimension: display means including a plurality of linearly arranged individually excitable indicators, including means exciting one of said indicators in response to sensing a part of said mean size and also including means exciting one of the indicators on opposite sides thereof in response to sensing increments of part size deviation of respectively opposite sense; a plurality of row excitation conductors interconnecting said indicators and a plurality of column excitation line conductors interconnecting said indicators such that the coincident selection for excitation of a row and column line conductor operates to select a given one of said indicators; means for producing a digital count signal representing the degree of part size deviation detectable by a probe, means for producing a second digital signal including means responsive to the sense of part size deviation detectable by a probe and means responsive to said count and second digital signals for selecting respective row and column excitation line conductors corresponding to said degree and sense signals so as to select for excitation a given one of said indicators.

35. Apparatus as defined in claim 34 wherein said indicators are light emitting diodes.

36. Apparatus as defined in claim 34 further including scale means disposed adjacent said linearly arranged plurality of indicator means such that the excited indicator is related to a marking on said scale means.

37. Apparatus as defined in claim 34 wherein the count signal representing the degree of part size deviation is a digital pulse count, the combination including a counter having a plurality of separately energizable outputs connected to control the row output for the row excitation conductors, means for producing a pair of complemental signals representing respective sense signals, means connecting one of said sense signals to one group of column excitation conductors, and means for connecting the other of said sense signals to control a second group of column excitation conductors such that coincidental excitation of one of said counter outputs and one of said sense signals excites an indicator representing the number in said count and the sense of said part size deviation.

38. In a sizing apparatus for use with a probe for measuring part size: display means including a plurality of individually excitable indicators arranged linearly for indicating the degree and sense of part size deviation from a means size measured by said sizing apparatus; said sizing apparatus including means exciting one of said indicators in response to measuring a part of said mean size and also including means exciting the indicators on opposite sides thereof in correspondence with measured increments of part size deviation of respectively opposite sense; probe means including means for defining a pair of interconnected current loops having a common leg, turning means including means for altering the current through said common leg in correspondence with measured part size, output means for producing an output signal corresponding to the polarity and amplitude of current through said common leg, and a variable gain amplifier means connected to receive said output means signal and to produce an amplifier signal corresponding to the polarity and amplitude of the output signal; and means connected to said display means exciting a given one of said indicators in correspondence with the polarity and amplitude of said amplifier output signal.

39. Apparatus as defined in claim 38 including alternating voltage means connected to excite said current loops and selectively variable nulling means for connecting a portion of said alternating signal to said output means for nulling the output signal independent of said tuning means.

40. Apparatus as defined in claim 39 further including selectively variable means connected to said variable gain amplifier for varying the gain thereof to represent various ranges of part size deviation increments by amplitude variations in the output of said variable gain amplifier.

41. A sizing apparatus for use with probe means for measuring part size and including: a columnar display including a plurality of individually excitable indicators for displaying the degree of part size deviation measured from a mean size, first signal means adapted for connection to a probe for generating a periodic waveform and including means varying the relative timing of said waveform in correspondence with measured part size relative to said mean size, second signal means for producing a digital count representing the degree in variation of timing of said periodic waveform relative a reference, and control means for connecting the digital count to the display and responsive to the number represented by said count to excite a particular one of said indicators.

42. Apparatus as defined in claim 41 wherein said control means comprises first and second counters for receiving the digital count and for assuming respective states representing the digits of said count, coincident current excitation means for controlling the excitation of said indicators in response to a coincident address consisting of first and second signals, the output of one counter being connected as the first address signal and the output of the second counter being connected as the second address signal.

43. Apparatus as defined in claim 41 wherein said indicators are lights.

44. Apparatus as defined in claim 41 further including as part of said first signal means a variable gain amplifier, and means for selectively varying the gain of the amplifier for varying the range of part size deviation increments detected and displayed by said apparatus.

45. Apparatus as defined in claim 41 including scale means removably disposed adjacent said indicators.

46. Apparatus as defined in claim 45 wherein the display comprises a housing, said scale means comprising a substantially vertically oriented bracket disposed on said housing and adapted to receive said scale in sliding relationship therein.

47. Apparatus as defined in claim 46 wherein said scale comprises an elongated plastic strip having a transparent portion through which said indicator means may be viewed and a printed portion adjacent said transparent portion and containing indicia representing part size deviation increments.

48. Apparatus as defined in claim 41 wherein said display means comprises a housing having a base and a vertically upstanding portion, said indicators being disposed linearly in said vertically upstanding portion.

49. Apparatus as defined in claim 41 further comprising limit detector means connected to receive said count and comprising means for selecting a limit, means responsive only to counts at least equal to said preselected limit and means for indicating the receipt of a count at least equal to said limit.

50. A sizing gage for use with a columnar display for indicating the sense and degree of part size deviation from a mean size comprising: probe means for measuring part size; first signal means generating a first waveform the relative timing corresponding to a size reference; second signal means connected to said probe means for generating a second periodic waveform and including means varying the relative timing of said first and second waveform in correspondence with measured size; third signal means responsive to said first and second waveforms producing a digital count corresponding to the relative timing difference between the first and second waveforms; fourth signal means responsive to said first and second waveforms producing a signal corresponding to the sense of said relative timing difference; and addressable control means for connecting the third and fourth signal means to a display for exciting said display according to the character of said digital count and sense.

51. Apparatus as defined in claim 50 further including an oscillator for producing a triangular waveform, means for connecting the oscillator to the first and second signal means, and a phase-locked loop connected to said oscillator for producing a digital pulse train of fixed relation to said triangular waveform, said phase-locked loop having the output thereof connected to said third signal means for providing said digital count as a gated portion of said digital pulse train.

52. A sizing gage having a columnar display for indicating the sense and degree of measured part size deviation from a mean size comprising: display means including a plurality of linearly arranged individually excitable indicators; said sizing gage including means exciting one of said indicators in response to measuring a part of said mean size and further including means exciting the indicators on opposite sides thereof in response to measuring increments of part size deviation of respectively opposite sense; timed based reference signal means; probe means for measuring part size and producing an AC signal, said probe means including means varying the amplitude of said AC signal in correspondence with said degree of deviation measured in a part size and further includes means varying said AC signal to lead or lag said reference signal according to the the sense of the measured deviation from said mean part size; means for adjusting the amplitude of said AC signal produced by the probe means to zero for any given part measured by said sizing gage whereby the size of said measured part defines the mean size; and coding means interconnecting the probe means with the display means and including means exciting the said one indicator when the amplitude of said AC signal of the probe means is zero and also including means exciting one of the other indicators when the output of the probe means is other than zero, the coding means further including means responsive to the amplitude and phase of the probe AC signal coincidentally selecting said other indicator for excitation.

53. Apparatus as defined in claim 52 further including means for indicating sensed part size outside upper and lower limits defining part size acceptability relative to said means size including means for determining whether the probe output signal is within said limits and producing an indication whenever the measured part size exceeds one of the upper and lower size limits.

* * * * *